(12) United States Patent
Springer

(10) Patent No.: US 12,483,615 B2
(45) Date of Patent: Nov. 25, 2025

(54) DYNAMIC DETERMINATION OF VIDEO STREAM QUALITY DISCREPANCIES IN A COMMUNICATION SESSION

(71) Applicant: Zoom Communications, Inc., San Jose, CA (US)

(72) Inventor: Shane Paul Springer, Manchester, MI (US)

(73) Assignee: Zoom Communications, Inc., San Jose, CA (US)

( * ) Notice: Subject to any disclaimer, the term of this patent is extended or adjusted under 35 U.S.C. 154(b) by 339 days.

(21) Appl. No.: 18/104,130

(22) Filed: Jan. 31, 2023

(65) Prior Publication Data

US 2024/0259459 A1 Aug. 1, 2024

(51) Int. Cl.
*H04L 65/80* (2022.01)
*G06F 3/14* (2006.01)
*G06T 7/00* (2017.01)
*G06T 7/174* (2017.01)
*H04L 65/75* (2022.01)

(52) U.S. Cl.
CPC ............ *H04L 65/80* (2013.01); *G06F 3/1454* (2013.01); *G06T 7/0002* (2013.01); *G06T 7/174* (2017.01); *H04L 65/75* (2022.05); *G06T 2207/10016* (2013.01); *G06T 2207/20081* (2013.01)

(58) Field of Classification Search
CPC ....... H04L 65/80; H04L 65/75; G06F 3/1454; G06T 7/0002; G06T 7/174; G06T 2207/10016; G06T 2207/20081
See application file for complete search history.

(56) References Cited

U.S. PATENT DOCUMENTS

| | | | |
|---|---|---|---|
| 8,558,894 B2 | 10/2013 | Tan et al. | |
| 9,521,170 B2 | 12/2016 | Bader-Natal et al. | |
| 9,538,139 B2 | 1/2017 | Whynot | |
| 9,578,073 B2 | 2/2017 | Bader-Natal et al. | |
| 9,674,243 B2 | 6/2017 | Bader-Natal et al. | |
| 9,674,244 B2 | 6/2017 | Katzman et al. | |
| 9,900,553 B2 | 2/2018 | Whynot | |
| 9,935,987 B2 | 4/2018 | Bader-Natal et al. | |

(Continued)

FOREIGN PATENT DOCUMENTS

| WO | WO2022228689 | * | 3/2022 | ............ G06Q 10/04 |
|---|---|---|---|---|
| WO | 2022228689 A1 | | 11/2022 | |

OTHER PUBLICATIONS

WO (Year: 2022).*

*Primary Examiner* — Yosef K Laekemariam
(74) *Attorney, Agent, or Firm* — Young Basile Hanlon & MacFarlane, P.C.

(57) ABSTRACT

Methods and systems provide dynamic adjustments for video optimization in a communication session. In one embodiment, the system receives, at a server, an outgoing video stream from a transmitting device to a receiving device; identifies a first set of video parameter data corresponding to the quality of the outgoing video stream; receives, from the receiving device, a second set of video parameter data corresponding to the quality of the video stream; determines one or more quality discrepancies between the first set of video parameter data and the second set of video parameter data; and provides notification of at least a subset of the quality discrepancies to one or both of the transmitting device and the receiving device.

20 Claims, 6 Drawing Sheets

(56) References Cited

U.S. PATENT DOCUMENTS

| | | |
|---|---|---|
| 9,961,119 B2 | 5/2018 | Bader-Natal et al. |
| 10,079,994 B2 | 9/2018 | Kang et al. |
| 10,110,645 B2 | 10/2018 | Bader-Natal et al. |
| 10,116,898 B2 | 10/2018 | Kang et al. |
| 10,122,965 B2 | 11/2018 | Taine et al. |
| 10,157,358 B1 | 12/2018 | Brisebois et al. |
| 10,303,928 B2 | 5/2019 | Taine et al. |
| 10,397,620 B2 | 8/2019 | Link |
| 10,541,824 B2 | 1/2020 | Bader-Natal et al. |
| 10,554,908 B2 | 2/2020 | Taine et al. |
| 10,567,448 B2 | 2/2020 | Bader-Natal et al. |
| 10,623,753 B2 | 4/2020 | Skupin et al. |
| 10,643,664 B1 | 5/2020 | Taine et al. |
| 10,645,427 B2 | 5/2020 | Lee |
| 10,666,696 B2 | 5/2020 | Bader-Natal et al. |
| 10,735,742 B2 | 8/2020 | Petajan et al. |
| 10,805,365 B2 | 10/2020 | Bader-Natal et al. |
| 10,820,021 B2 | 10/2020 | Link |
| 10,867,163 B1 | 12/2020 | Taine et al. |
| 10,897,654 B1 | 1/2021 | Wei et al. |
| 10,950,275 B2 | 3/2021 | Taine et al. |
| 11,019,284 B1 | 5/2021 | Taine et al. |
| 11,019,373 B2 | 5/2021 | Lee |
| 11,082,661 B1 * | 8/2021 | Pollefeys ............. H04N 7/15 |
| 11,184,421 B2 | 11/2021 | Pichaimurthy et al. |
| 11,217,109 B2 | 1/2022 | Bader-Natal et al. |
| 11,265,181 B1 | 3/2022 | Springer |
| 11,272,228 B2 | 3/2022 | Link |
| 11,297,355 B1 | 4/2022 | Wei et al. |
| 11,297,365 B2 | 4/2022 | Sen et al. |
| 11,528,515 B2 | 12/2022 | Link |
| 11,546,550 B2 | 1/2023 | Pollefeys |
| 11,621,991 B2 | 4/2023 | Chandrashekar et al. |
| 11,659,212 B1 | 5/2023 | Wei et al. |
| 11,729,244 B2 | 8/2023 | Pichaimurthy et al. |
| 11,750,889 B2 | 9/2023 | Chandrashekar et al. |
| 11,831,816 B2 | 11/2023 | Wang et al. |
| 2018/0063549 A1 | 3/2018 | Amer et al. |
| 2018/0242015 A1 | 8/2018 | Katsavounidis |
| 2018/0365581 A1 | 12/2018 | Vasseur et al. |
| 2019/0037002 A1 | 1/2019 | Arunachalam et al. |
| 2022/0286728 A1 | 9/2022 | Nashida et al. |
| 2022/0329883 A1 | 10/2022 | Stokking |
| 2022/0334635 A1 * | 10/2022 | Hawkins ......... H04N 21/234363 |
| 2022/0337888 A1 | 10/2022 | Soman et al. |
| 2023/0032959 A1 | 2/2023 | Gupta et al. |
| 2023/0107968 A1 | 4/2023 | Trivedi et al. |
| 2023/0113024 A1 | 4/2023 | Lin et al. |
| 2024/0223832 A1 | 7/2024 | Chen et al. |
| 2024/0328815 A1 | 10/2024 | Phillips |
| 2024/0331180 A1 | 10/2024 | Phillips |

\* cited by examiner

DYNAMIC DETERMINATION OF VIDEO STREAM QUALITY DISCREPANCIES IN A COMMUNICATION SESSION

FIELD

The present application relates generally to digital communication, and more particularly, to systems and methods for providing dynamic adjustments for video optimization in a communication session.

SUMMARY

The appended claims may serve as a summary of this application.

BRIEF DESCRIPTION OF THE DRAWINGS

The present application relates generally to digital communication, and more particularly, to systems and methods for providing dynamic adjustments for video optimization in a communication session.

The present disclosure will become better understood from the detailed description and the drawings, wherein.

DETAILED DESCRIPTION OF THE DRAWINGS

Figure 1:
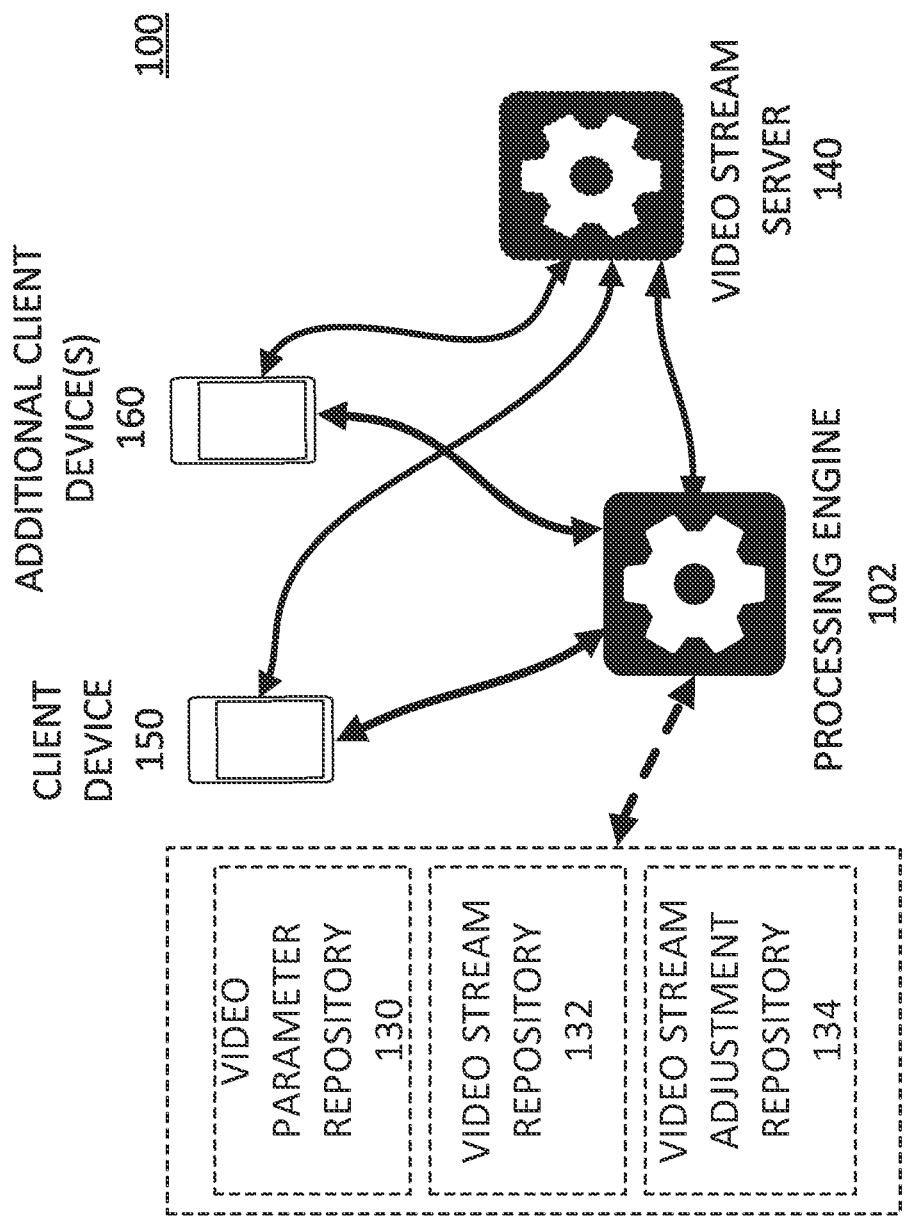
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Within a video communication session that includes multiple video participants, the video quality of a particular client device operated by a given participant may or may not be optimized for that client device's networking and processing capabilities.

For instance, a video stream server may be configured to receive a video stream from a transmitting device within a communication session. That video stream server then sends the video stream on to one or more receiving client devices within the same communication session. While the video stream was transmitted to be played back at a frame rate of 60 frames per second, at least one receiving client device plays back the received video stream at 30 frames per second. The source of the issue may be, for example, the Graphical Processing Unit ("GPU") of the receiving device, the internet speed of the receiving device, or other potential causes. While the participant associated with the receiving device in question may be able to configure settings for the communication session to "optimize for video" (i.e., optimize for a better frame rate for video content shared during a communication session), the participant does not know whether the poor frame rate is intrinsic to the nature of the video or not, and does not know whether such optimization will help. The user may also not be savvy enough to know that such a setting exists and can be toggled manually for the communication session on their device. The participant has not been informed that the video as transmitted is of higher quality along various parameters than the video as received and played back, and cannot manually take action accordingly to improve those parameters.

Thus, there is a need in the field of digital communication to create new and useful systems and methods for providing dynamic adjustments for video optimization in a communication session. The source of the problem, as discovered by the inventors, is a lack of ability for a participant to be notified of determined quality discrepancies between a video stream as it is transmitted by a transmitting device and the video stream as it is received by the participant's client device, and a lack of dynamic, automated quality optimization or video stream adjustment to address those quality discrepancies.

In one embodiment, the system receives, at a server, an outgoing video stream from a transmitting device to a receiving device; identifies a first set of video parameter data corresponding to the quality of the outgoing video stream; receives, from the receiving device, a second set of video parameter data corresponding to the quality of the video stream; determines one or more quality discrepancies between the first set of video parameter data and the second set of video parameter data; and provides notification of at least a subset of the quality discrepancies to one or both of the transmitting device and the receiving device.

In another embodiment, the system receives a video stream from a transmitting device; transmits the video stream to one or more client devices, the video stream having associated video transmission quality parameters; receives, from the one or more client devices, initial video display quality parameters related to the video stream; determines a video stream adjustment by comparing the video transmission quality parameters with the video display quality parameters; generates a modified video stream by applying the video stream adjustment to the video stream; and transmits the modified video stream to the one or more client devices; receives, from the one or more client devices, updated video display quality parameters related to the modified video stream; and compares the updated video display quality parameters to the initial video display quality parameters to determine that one or more video quality metrics have increased.

Further areas of applicability of the present disclosure will become apparent from the remainder of the detailed description, the claims, and the drawings. The detailed description and specific examples are intended for illustration only and are not intended to limit the scope of the disclosure.

FIG. 1 is a diagram illustrating an exemplary environment in which some embodiments may operate. In the exemplary environment 100, a client device 150 is connected to a processing engine 102 and a video stream server 140. The processing engine 102 is connected to the video stream server 140, and optionally connected to one or more repositories and/or databases, including, e.g., a video parameter repository 130, video stream repository 132, and/or a video stream adjustment repository 134. One or more of the databases may be combined or split into multiple databases. The client device 150 in this environment may be a computer, and the processing engine 102 may be an application or software hosted on a computer or multiple computers which are communicatively coupled via remote server or locally.

The exemplary environment 100 is illustrated with only one client device, one processing engine, and one video communication platform, though in practice there may be more or fewer additional client devices, processing engines, and/or video communication platforms. In some embodiments, the client device(s), processing engine, and/or video communication platform may be part of the same computer or device.

In an embodiment, the processing engine 102 may perform the exemplary method of FIG. 2 or other method herein and, as a result, provide dynamic adjustments for video optimization in a communication session. In some embodiments, this may be accomplished via communication with the client device, additional client device(s), processing engine, video stream server, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with one or more displays configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or video stream server 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 may be hosted in whole or in part as an application or web service executed on the client device 150. In some embodiments, one or more of the video stream server 140, processing engine 102, client device 150, and additional client device(s) 160 may be the same device. In some embodiments, the user's client device 150 is associated with a first user account within a video communication platform, and one or more additional client device(s) 160 may be associated with additional user account(s) within the video communication platform.

In some embodiments, optional repositories can include one or more of a video parameter repository 130, camera stream repository 132, and/or video stream adjustment repository 134. in The optional repositories function to store and/or maintain, respectively, video transmission quality parameters and video display quality parameters for video streams within the communication session; video stream content within the communication session; and adjustments to be made for modifying video streams. The optional database(s) may also store and/or maintain any other suitable information for the processing engine 102 or video communication platform 140 to perform elements of the methods and systems herein. In some embodiments, the optional database(s) can be queried by one or more components of system 100 (e.g., by the processing engine 102), and specific stored data in the database(s) can be retrieved.

The processing engine 102 provides processing of data for a video communication platform. In various embodiments, the video communication platform is a platform configured to facilitate meetings, presentations (e.g., video presentations) and/or any other communication between two or more parties, such as within, e.g., a video conference or virtual classroom. A communication session within the video communication platform may be, e.g., one-to-many (e.g., a participant engaging in video communication with multiple attendees), one-to-one (e.g., two friends remotely communicating with one another by video), or many-to-many (e.g., multiple participants video conferencing with each other in a remote group setting).

Figure 2A:
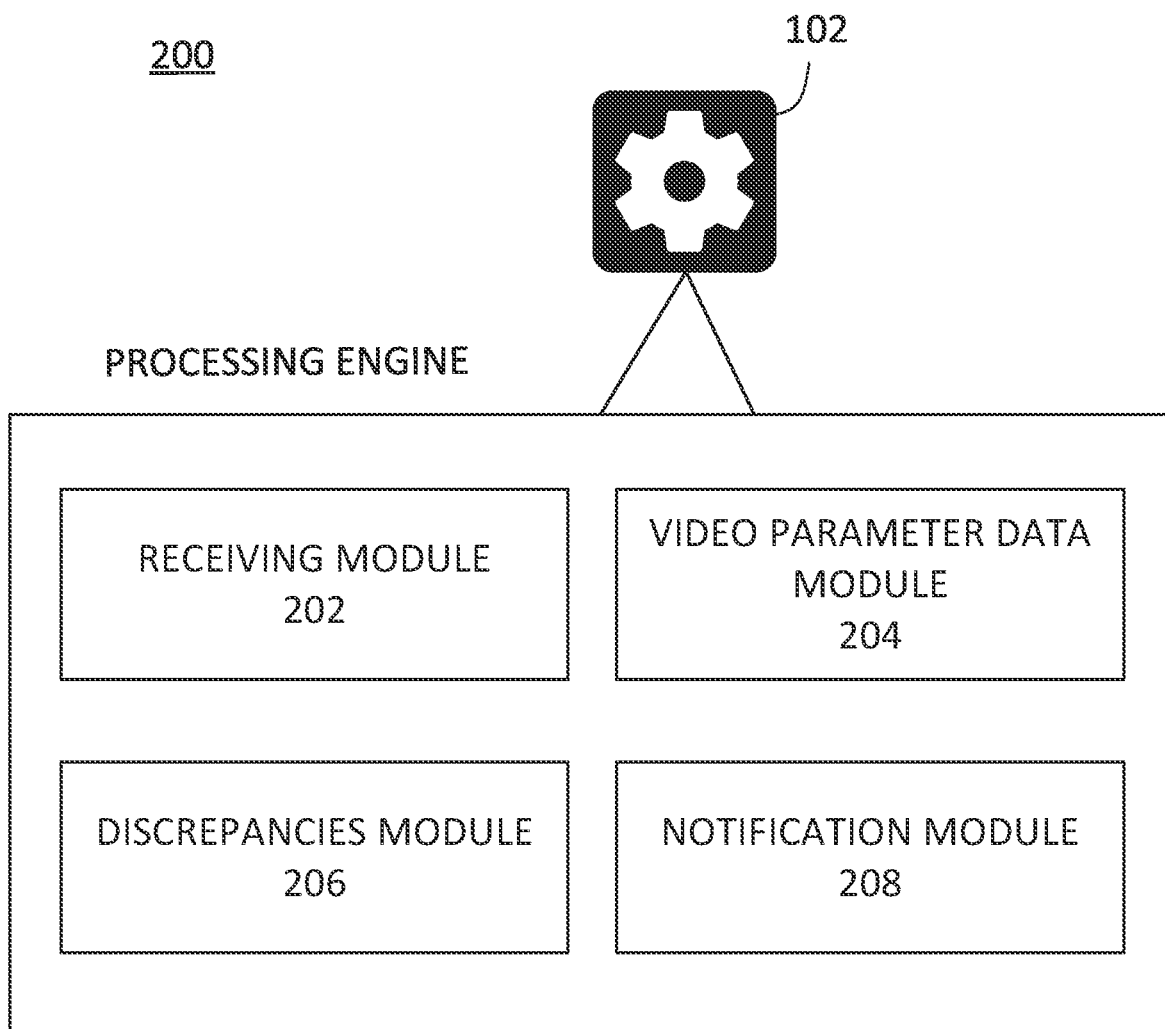
FIG. 2A is a diagram illustrating an exemplary computer system that may execute instructions to perform some of the methods herein.

FIG. 2A is a diagram illustrating an exemplary computer system 200 with software modules that may execute some of the functionality described herein. In some embodiments, the modules illustrated are components of the processing engine 102.

Receiving module 202 functions to receive, at a server, an outgoing video stream from a transmitting device to be transmitted to a receiving device, the outgoing video stream including a video signal.

Video parameter data module 204 functions to identify a first set of video parameter data corresponding to the quality of the outgoing video stream, and receive, from the receiving device, a second set of video parameter data corresponding to the quality of the video stream as received and played back at the receiving device.

Discrepancies module 206 functions to determine one or more quality discrepancies between the first set of video parameter data and the second set of video parameter data.

Notification module 208 functions to provide notification of at least a subset of the quality discrepancies to one or both of the transmitting device and the receiving device.

The above modules and their functions will be described in further detail in relation to an exemplary method below.

Figure 2B:
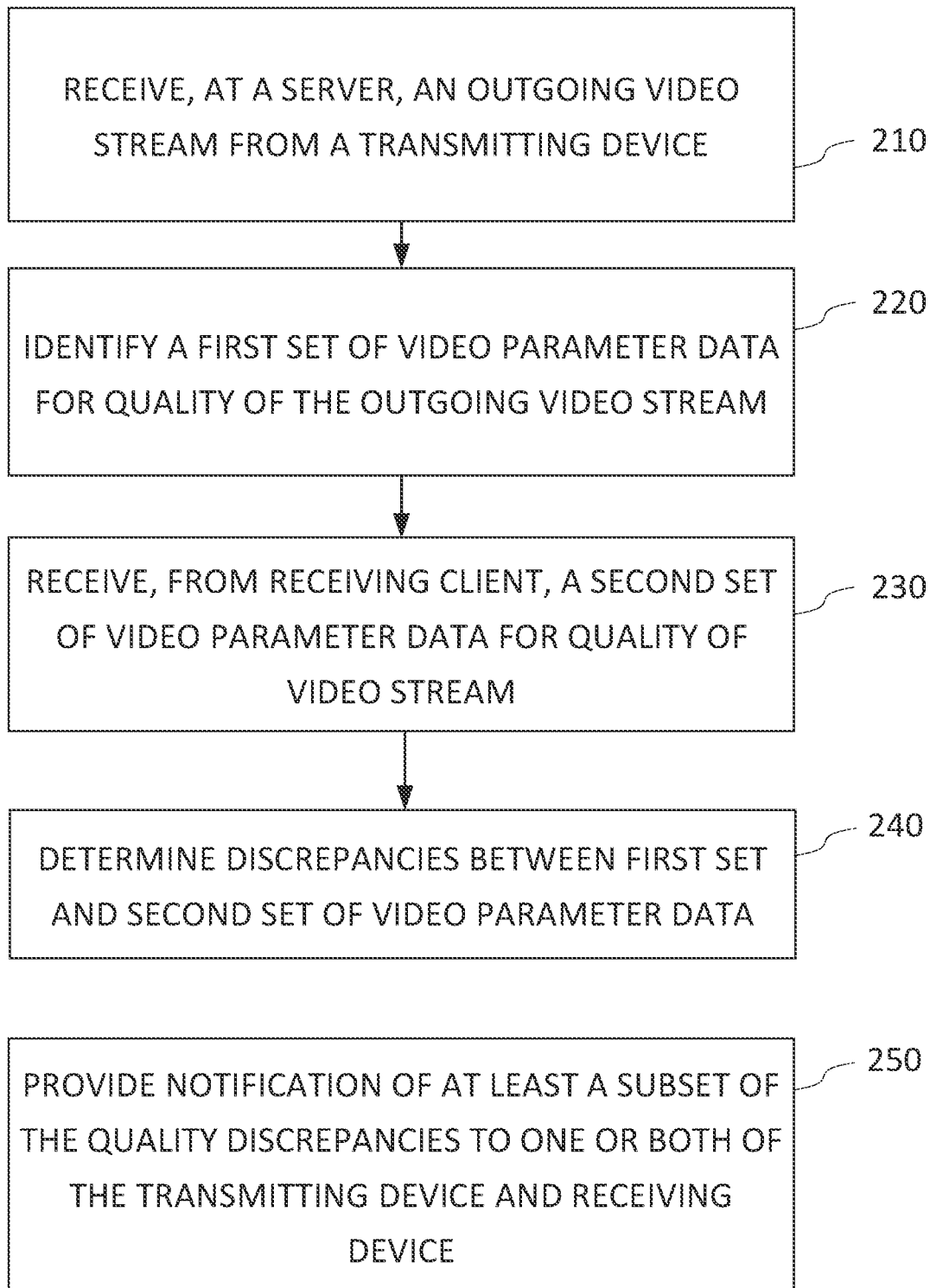
FIG. 2B is a flow chart illustrating an exemplary method that may be performed in some embodiments.

FIG. 2B is a flow chart illustrating an exemplary method that may be performed in some embodiments.

At step 210, the system receives, at a server, an outgoing video stream from a transmitting device to be transmitted to a receiving device, the outgoing video stream including a video signal.

In some embodiments, the system receives this video stream as part of a number of video streams which are to be included within a communication session, which is hosted on a communication platform. In some embodiments, the system presents a UI for each of a number of client devices connected to a communication session, with each UI including one or more video streams associated with participants of the communication session. In some embodiments, the transmitting device is one of the client devices associated with a participant of the communication session. In some embodiments, the receiving device is another of the client devices associated with participants of the communication session other than the participant associated with the transmitting device, where the transmitting device is a different device than the receiving device.

In some embodiments, the system connects participants to a live communication stream via their respective client devices. The communication stream may be any "session" (such as an instance of a video conference, webinar, informal chat session, or any other suitable session) initiated and hosted via the video communication platform, for remotely communicating with one or more users of the video communication platform, i.e., participants within the video communication session. Participants are connected on user devices, and are associated with user accounts within the communication platform.

The UI for the video communication session is displayed on the client device of each participant. In some embodiments, the UI appears different for different participants, or has different UI elements included for different participants depending on their user permissions, access levels (e.g., a premium-tier business user account as compared to a free-tier user account), or other aspects that may differentiate one participant from another within the video communication platform. In various embodiments, the UI is configured to allow the participant to, e.g., navigate within the video communication session, engage or interact with one or more functional elements within the video communication session, control one or more aspects of the video communication session, and/or configure one or more settings or preferences within the video communication session.

In some embodiments, the system receives a number of video streams from transmitting devices. The video streams may depict imagery of a number of participants, and each video stream may have multiple video frames. In some embodiments, the video streams are each generated via an external device, such as, e.g., a video camera or a smartphone with a built-in video camera, and then the video content is transmitted. In some embodiments, the video content is transmitted to a video stream server which is configured to send, receive, and/or analyze video streams in various ways within the communication platform.

In some embodiments, the video content is generated within the system, such as on a participant's client device. For example, a participant may be using their smartphone to record video of themselves giving a lecture. The video can be generated on the smartphone and then transmitted to the processing system, a local or remote repository, or some other location. In some embodiments, one or more of the video streams are pre-recorded and are retrieved from local or remote repositories. In various embodiments, the video content can be streaming or transmitted content, pre-recorded video content, or any other suitable form of video content. The video streams each have multiple video frames, each of which may be individually or collectively processed by the processing engine of the system.

In some embodiments, the video streams are received from one or more video cameras connected to a client device associated with each participant. Thus, for example, rather than using a camera built into the client device, an external camera can be used which transmits video to the client device, or some combination of both.

In some embodiments, the participants are users of a video communication platform, and are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform. In some embodiments, synchronous or asynchronous messaging may be included within the communication session, such that the participants are able to textually "chat with" (i.e., sends messages back and forth between) one another in real time.

At least a portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). In some embodiments, the participant windows are arranged in a specific way according to one or more criteria, such as, e.g., current or most recent verbal participation, host status, level of engagement, and any other suitable criteria for arranging participant windows. Some participant windows may not contain any video, for example, if a participant has disabled video or does not have a connected video camera device (e.g. a built-in camera within a computer or smartphone, or an external camera device connected to a computer).

At step 220, the system identifies a first set of video parameter data corresponding to the quality of the outgoing video stream. The outgoing video stream is the video stream sent from the transmitting device as it is transmitted and prior to the receiving device receiving it.

The video parameter data may be any data relating to video parameters that correspond to video quality. In varying embodiments, such video parameter data for the outgoing video stream may include, for example: display resolution of the video; display size of the video; the video codec used; the compression quality of the video; the presence or absence of visible artifacts in the video (e.g., quilting, combing, or banding artifacts); the color space represented in the video; the bit rate of the video; or any other parameters or metrics which have an effect on the visual quality or visual fidelity of the video.

In some embodiments, video parameter data may also include parameters which affect the performance parameters of the video as it is played, such as, for example, the frame rate and/or frame time of the video as transmitted; the latency of the video playback; the presence or absence of jitter within the video; the presence or absence of packet loss within the video; the synchronization or lack thereof between the video stream and a corresponding audio stream; or any other video parameters which relate to the performance or playback of the video.

In some embodiments, identifying the first set of video parameter data includes training a machine learning ("ML") model to determine a set of video parameters related to video stream optimization; inputting the outgoing video stream into the trained ML model; and identifying, via the trained ML model, video parameter data from the outgoing video stream correlating to each of the determined video parameters. In various embodiments, the ML model may be e.g., a neural network, deep learning model, computer vision model, or any other ML model which has been trained to determine (e.g., predict within a specified threshold of confidence) video parameters given a video stream as input. In some embodiments, such an ML model may be trained on a dataset of a multitude of previous video streams within the communication platform. In some embodiments, the dataset may be labeled with various video parameters for the video streams as they are transmitted and/or as they were received by one or more receiving devices. In some embodiments, the ML, model is trained to identify a set of features for a given input video stream, and extract video parameter data from these features.

In some embodiments, the system enables a transmission of the video stream from the transmitting device to the receiving device, and the transmission is performed directly from one device to the other. In other embodiments, the system enables a transmission of the video stream from the video stream server to the receiving device, with the video stream server acting as a medium for transmission of the video stream to the client device that serves as the receiving device. Thus, in this scenario, the video stream is first sent from the transmitting device to the video stream server, and then the video stream server sends the video stream on to the receiving device. In some embodiments, the video stream can be further concatenated to be sent to one or more additional receiving devices, to enable a "one to many" video stream transmission.

At step 230, the system receives, from the receiving device, a second set of video parameter data corresponding to the quality of the video stream as received and played back at the receiving device. In some embodiments, once the receiving device receives the video stream, the receiving device locally analyzes the incoming video stream as it is received or after it is received. The receiving device then reports back to the server with data on the quality of that video stream. In some embodiments, this data is, at least in part, metadata extracted by the receiving device from the incoming or received video stream. In some embodiments, the receiving device transmits a data packet back to the video stream server containing the metadata on the video parameter data corresponding to the quality of the video stream as received and played back. In some embodiments, the receiving device may additionally or alternatively send statistics or data on metrics back to the video stream server. In some embodiments, the receiving device does not transmit the same video stream back to the server, as the video stream would be degraded in this transfer back to the video stream and accurate quality data of the stream as received and played back by the receiving device would not be present. Instead, in some embodiments, the video stream server receives, from the receiving device, an indication in the form of data of how the video stream has been received by the receiving device in terms of quality of the video stream.

In some embodiments, the video stream parameters for the incoming video stream may include one or more of the same video stream parameters as the outgoing video stream. In some embodiments, the received second set of video parameter data comprises the same identical video parameter types as the first set of video parameter data.

At step 240, the system determines one or more quality discrepancies between the first set of video parameter data and the second set of video parameter data. That is, the system analyzes the first set of video parameter data (i.e., for the video stream as transmitted by the transmitting device) and the second set of video parameter data (i.e., for the video stream as received and played back by the receiving device) and determines, for example, whether the two match identically, match closely, or do not match. If the two sets of video parameter data match identically or closely enough that there is negligible practical difference, then the system can conclude that the video stream has been received in essentially the same quality as it was sent. Conversely, if there is no match or a very poor match between the two sets of video parameter data, then the system can determine that there are one or more significant quality discrepancies, and that the video stream has not been received at the same quality it was sent, but rather it has been received in poorer quality than it has been sent.

In some embodiments, determining the one or more quality discrepancies between the first set of video parameter data and the second set of video parameter data is performed using one or more ML techniques. In some embodiments, one or more ML models may be trained to accept the two sets of video parameter data as inputs, and output a determination of whether there is a match such that the video quality is identical or, at the least, nearly identical such that there is no practical difference in quality as experienced by the participant associated with the receiving device. In various embodiments, the one or more ML models may be, e.g., computer vision models, a neural network, deep learning models, or any other suitable ML models.

In some embodiments, the determined one or more quality discrepancies include a discrepancy in video resolution. In some cases, a video stream received by a receiving device may be downgraded in resolution. For example, the video stream as transmitted may have a resolution of 1080p, while the video stream as received and played back may have a resolution of 720p. This may be due to dynamic quality adjustments from the system during transmission due to detected network or bandwidth issues which affect the receiving device's ability to receive a video stream in real-time. Rather than allowing the video stream to buffer for an arbitrary period of time, adjustments to quality may be made in order for the video stream to be received with a minimum of buffering experienced by the end user of the receiving device. Thus, a video stream that is transmitted at a high resolution may be received at a lower resolution, leading to a quality discrepancy which is determined by the system.

In some embodiments, the determined one or more quality discrepancies include a discrepancy in video frame rate. In some cases, a video stream may be received at a lower frame rate than it was transmitted. This results in video which may be experienced upon playback as "choppy" or as stuttering video. In some cases, one or more dropped frames cause such issues. Dropped frames within a video stream may be due to a performance issue with the receiving device's internet connection, for example. If there is a discrepancy between the frame rate transmitted and the frame rate received, the system can determine that the source of the issue is likely not, for example, a faulty camera or faulty output of the transmitting device, but rather an issue experienced at the receiving device. For example, the frame rate of the video stream as transmitted may be 60 frames per second, while the frame rate of the video stream as received and played back may be 30 frames per second.

In some embodiments, the determined one or more quality discrepancies include a discrepancy in replacement rate of pixels shared between the outgoing video stream and the incoming video stream. The replacement rate or refresh rate of pixels for a video stream upon playback relates to how many times a display can refresh the image on-screen. In the case of jitter experienced during a video stream, caused by, e.g., dropped packets within the network, or a lower replacement rate of pixels at the receiving device compared to the transmitting device, the source of the problem may be the display of the receiving device being unable to receive the video stream at the same replacement rate as it was intended to be received at. This may lead to, for example, only a subset of the outgoing pixels from the transmitting device being received at the receiving client device.

In some embodiments, the outgoing video stream further includes an audio signal, and the determined one or more quality discrepancies include a discrepancy in audio quality. In some embodiments, the discrepancy in audio quality includes a discrepancy in audio bit rate. If the received video stream is at a much lower audio bit rate than the transmitted video stream, the audio may be heard as overly compressed, with audio artifacting and other undesirable phenomena being present.

At step 250, the system provides notification of at least a subset of the quality discrepancies to one or both of the transmitting device and the receiving device. In some embodiments, such a notification may take the form of a message which is displayed on the screen of the transmitting device and/or receiving device. Such a message may be displayed within, for example, a UI relating to a communication session the participant is currently attending. Such a notification of the receiving device experiencing different or more degraded video or audio than intended may be useful for a participant who is transmitting video to be informed of. For example, upon being notified of such a degradation in quality, the transmitting participant may opt to stop sending video and share a presentation with still frames instead, or may opt to send a different video which may be received and played back at a higher quality level. In some embodiments, the transmitting participant may wish to inform the receiving participant of the loss in quality and suggest one or more tips for improving the quality. Similarly, if the receiving participant is notified of the degradation in quality, then they will not be confused about whether the video was originally transmitted at the same quality or whether they are simply receiving degraded quality in the video, and they may be able to take various steps to improve the quality, such as troubleshooting for bandwidth or network issues.

In some embodiments, the system: determines, based on the one or more quality discrepancies, one or more optimization actions to be performed on the incoming video stream; generates a processed video stream by performing the one or more optimization actions on the incoming video stream; and sends the processed video stream to be transmitted to the receiving device as a substitute for the incoming video stream. Thus, in some embodiments, the system may not simply notify one or more participants of degraded video quality along various parameters, but may dynamically perform one or more actions to optimize the video quality in various ways. The system may then generate a processed video stream by executing the optimization action(s) on the incoming video stream, and send that processed video stream to be transmitted in place of the initial video stream. In some embodiments, the optimization actions may be determined based on the discrepancies which were identified with respect to the first and second sets of video parameter data. In some embodiments, the optimization actions may be determined based on the nature or details of the shared content within the video stream.

In some embodiments, the one or more optimization actions include reducing the color space of at least a portion of the incoming video stream. For example, if the color space of presentation content being shared in the video stream only amounts to 10 colors, then the system may proceed to reduce the color complexity of the overall color space of the received video stream. In some embodiments, this can enable the video stream to be received at a higher frame rate or higher resolution during instances where the quality discrepancy was in frame rate and/or resolution.

In some embodiments, the one or more optimization actions include: segmenting, based on the one or more quality discrepancies, the incoming video stream into a number of regions, and applying one or both of: a quality reduction to one or more video parameters within a subset of the regions, and a quality increase to one or more video parameters in a subset of the regions. In some embodiments, a quality reduction to one or more video parameters is applied, the quality reduction involving a selective refresh of frames from the incoming video stream within a subset of the regions. In some embodiments, shared content is presented within a region of the incoming video stream, and the segmenting of the incoming video stream is performed based on the region where the shared content is presented. For example, in some scenarios, shared content may only appear within the top left of the video stream, with the rest of the space being unused or being depicted as all black or all white. The system may execute optimization actions so that the unused space within the video stream can be restricted substantially in terms of, e.g., color space, resolution, and/or compression, while increasing the color space, resolution, frame rate, refresh rate, or other aspects of the shared content within its region of the video stream.

In some embodiments, the outgoing video stream further includes an audio signal, and the one or more optimization actions include converting the audio signal of the incoming video stream from a stereophonic audio signal to a monophonic audio signal. In some cases, this may lead other aspects of the video stream to be received and played back at a higher quality, without any major loss to audio playback. In some embodiments, the system can determine that the shared content was transmitted without any stereo qualities to the sound, and thus the sound can be reduced to monophonic audio without any change in the audio as experienced by the end user. In some embodiments, the one or more optimization actions include applying one or more filters to the audio signal of the incoming video stream to reduce a range of audio frequencies. In some embodiments, this may be performed upon the system determining that those particular audio frequencies are either unused in the video stream or are beyond the capacity of human hearing.

In some embodiments, the system: receives, at the server, a number of additional outgoing video streams from a number of additional transmitting devices to be transmitted to the receiving device as a number of incoming video streams; identifies additional sets of video parameter data corresponding to the quality of the additional outgoing video streams; determines one or more additional quality discrepancies between the additional sets of video parameter data and the second set of video parameter data; and provides notification of at least a subset of the additional quality discrepancies to one or more of: the corresponding transmitting device, and the receiving device.

In some embodiments, a multitude of different pieces of shared content are presented within a number of additional outgoing video streams. The system determines that a subset of the different shared content is not being displayed at the receiving device, and then performs one or more quality reductions to one or more video parameters for the subset of the different shared content that is not being displayed at the receiving device.

In some embodiments, a peer-to-peer network is configured between the transmitting device and receiving device, such that, e.g., a video stream, video display quality parameters, and other data may be transmitted directly between the transmitting device and receiving device. In such embodiments, no video stream server is needed to transmit the video stream to the receiving device, determine quality discrepancies, or other steps. In various embodiments, at least one of such steps is performed directly by the transmitting device, receiving device, or both.

Figure 3A:
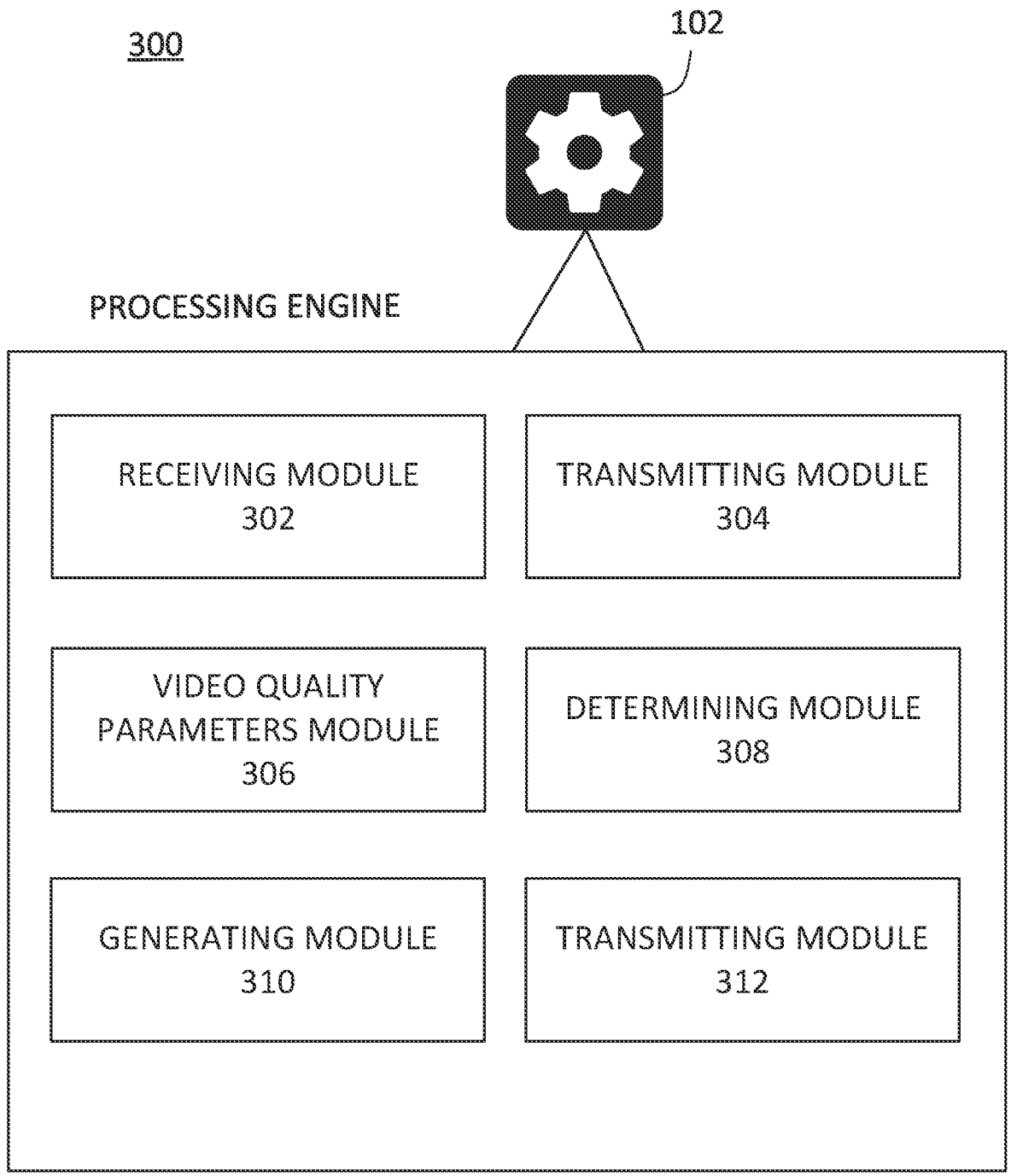
FIG. 3A is a diagram illustrating an exemplary computer system that may execute instructions to perform some of the methods herein.

FIG. 3A is a diagram illustrating an exemplary computer system 300 with software modules that may execute some of the functionality described herein. In some embodiments, the modules illustrated are components of the processing engine 102.

Receiving module 302 functions to receive a video stream from a transmitting device.

Transmitting module 304 functions to transmit the video stream to one or more client devices, the video stream having associated video transmission quality parameters. Video quality parameters module functions to receive, from the one or more client devices, video display quality parameters related to the video stream, as well as updated video display quality parameters related to a modified video stream.

Determining module 308 functions to determine a video stream adjustment by comparing the video transmission quality parameters with the video display quality parameters; and functions to compare updated video display quality parameters to the initial video display quality parameters to determine that one or more video quality metrics have increased. Generating module 310 functions to generate a modified video stream by applying the video stream adjustment to the video stream.

Transmitting module 312 functions to transmit the modified video stream to the one or more client devices.

Figure 3B:
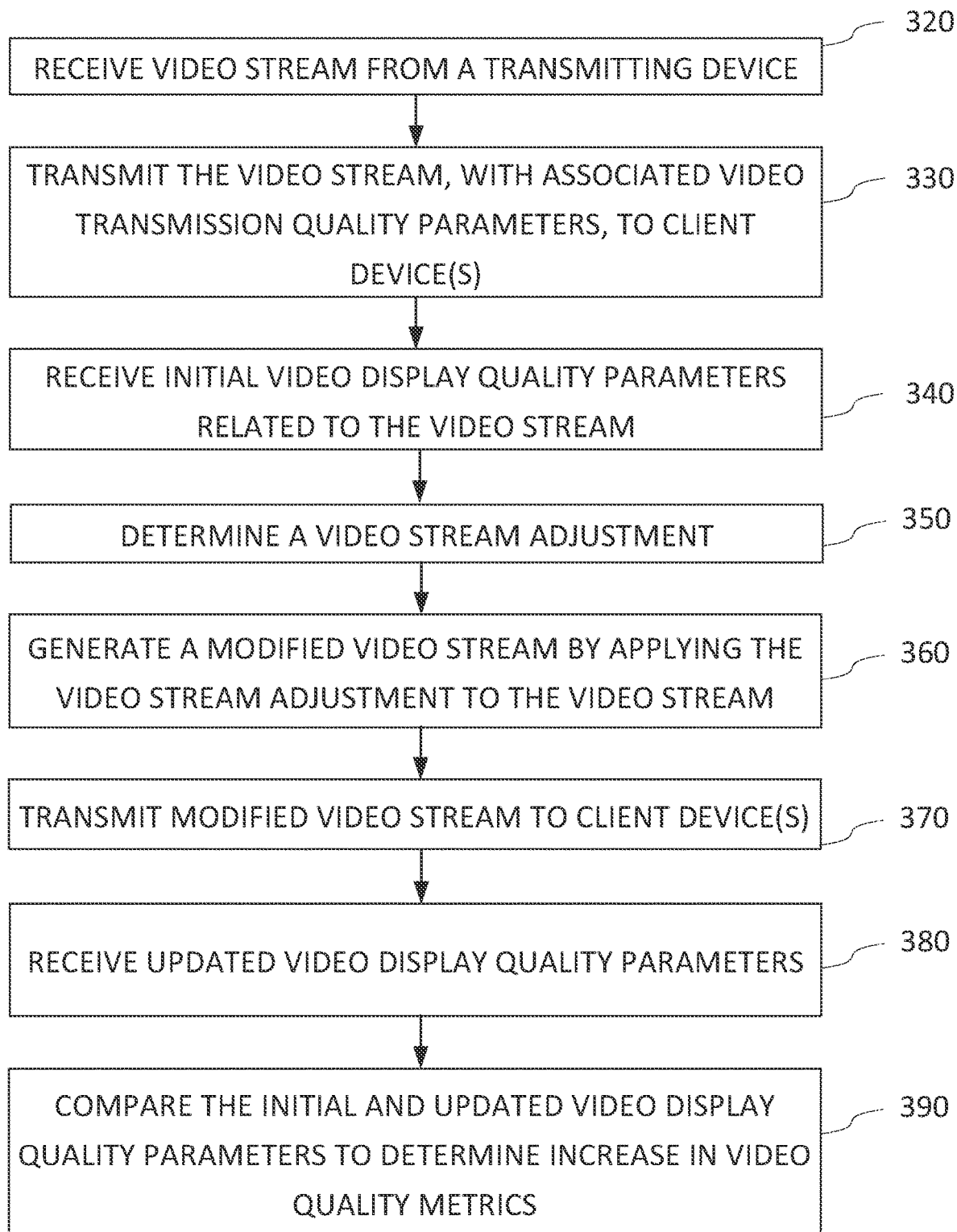
FIG. 3B is a flow chart illustrating an exemplary method that may be performed in some embodiments.

FIG. 3B is a flow chart illustrating an exemplary method that may be performed in some embodiments.

At step 320, the system receives a video stream from a transmitting client device (i.e., transmitting device which is a client device within a communication session). In various embodiments, the transmitting device can send a video stream to the system in one or more of the ways discussed above with respect to step 210 of FIG. 2B.

At step 330, the system transmits the video stream to one or more client devices (i.e., receiving devices which are client devices within the communication session), the video stream having associated video transmission quality parameters. In various embodiments, the system transmits the video stream on to the one or more receiving devices in one or more of the ways discussed above with respect to FIG. 2B. In some embodiments, a video stream server sends the video stream on to the client devices. In other embodiments, the video stream is sent directly from the transmitting client device to the one or more receiving devices.

In some embodiments, the system receives the video transmission quality parameters as associated metadata of the video stream itself, or as data packets sent alongside the video stream. In some embodiments, the system extracts the video transmission quality parameters from the video stream during analysis of the video stream. In some embodiments, one or more of these processes may be performed at the local receiving device(s).

At step 340, the system receives, from the one or more client devices, video display quality parameters related to the video stream. In various embodiments, the system receives these video display quality parameters in one or more ways discussed above with respect to the system receiving the second set of video parameter data from the receiving device in step 230 of FIG. 2B.

At step 350, the system determines a video stream adjustment by comparing the video transmission quality parameters with the video display quality parameters. In some embodiments, the comparison of the video transmission quality parameters (pertaining to the quality of the video stream as transmitted) with the video display quality parameters (pertaining to the quality of the video stream as received and played back) is performed in one or more ways discussed above with respect to the system determining one or more quality discrepancies between sets of video parameter data in step 240 of FIG. 2B. In various embodiments, determining a video stream adjustment is performed in one or more ways discussed above with respect to the system performing one or more optimization actions in FIG. 2B.

In some embodiments, the video stream adjustment includes one or more of: an adjustment for a change in a bit rate, a change in a frame rate, a change in a resolution, or a change in an audio bit-depth. Upon comparison of the video display and video transmission quality parameters, discrepancies in bit rate, frame rate, resolution, or audio bit-depth may lead to video stream adjustment being performed in order to optimize the video quality along those parameters.

In some embodiments, the video stream adjustment includes an adjustment for changing the color space of at least a portion of the video stream, as discussed above with respect to performing optimization actions to increase or reduce the color space of the video stream or a portion of the video stream in FIG. 2B.

In some embodiments, determining the video stream adjustment includes the system determining that a subset of shared content within the video stream is not being displayed at the receiving device, and then performing one of more quality reductions to one or more video parameters for the subset of the shared content that is not being displayed at the one or more client devices. In varying embodiments, this determination and performance of quality reduction(s) may be performed in one or more ways discussed above with respect to optimizing actions for reducing the video quality of regions of unused space within a video stream in FIG. 2B.

In some embodiments, the video stream adjustment includes applying one or more filters to the audio signal of the video stream to reduce a range of audio frequencies, as discussed above in FIG. 2B with respect to performing optimization actions to filter out audio frequencies which cannot be heard or which are not used in the video stream.

In some embodiments, comparing the video transmission quality parameters with the video display quality parameters is performed via a trained ML model, as discussed above with respect to determining quality discrepancies using ML techniques in FIG. 2B.

In some embodiments, comparing the video transmission quality parameters with the video display quality parameters includes determining that the visual fidelity of shared content within the video stream as displayed is degraded in comparison to the quality of the shared content within the video stream as transmitted. In some embodiments, this may involve the system analyzing the actual shared content within individual video frames of the stream. For example, the system may detect that a face of a participant appears different enough within a threshold of difference for one or more video stream adjustments to be determined based on the nature of the difference. For example, the difference within the analyzed content may be a difference in color range, artifacts within the pixels, or other aspects, with adjustments being suggested accordingly for an increase in color range, removal of compression-based artifacts, or similar.

In some embodiments, comparing the video transmission quality parameters with the video display quality parameters comprises determining that the frame rate performance of shared content within the video stream as displayed is degraded in comparison to the quality of the shared content within the video stream as transmitted. In some embodiments, this determination involves receiving data from the receiving device on frame rate of the shared content within the video stream upon playback.

In some embodiments, determining the video stream adjustment includes segmenting the video stream into a number of regions, and then applying one or both of: a quality reduction to one or more video display parameters within a subset of the regions, and a quality increase to one or more video display parameters in a subset of the regions. In some embodiments where a quality reduction to one or more video parameters is applied, the quality reduction can include a selective refresh of frames from the video stream within a subset of the regions. In some embodiments, shared content is presented within a region of the video stream, and the segmenting of the video stream is performed based on the region where the shared content is presented. One or more techniques for these procedures are discussed above with respect to FIG. 2B.

At step 360, the system generates a modified video stream by applying the video stream adjustment to the video stream.

In some embodiments, generating the modified video stream includes optimizing the modified video stream for one or more client devices, such that a transmission bandwidth of the video stream is reduced for the modified video stream. In some embodiments, optimizing the modified video stream for the one or more client devices includes one or both of: a reduced frame rate, and a reduced bit rate resolution.

In some embodiments, generating the modified video stream includes optimizing the modified video stream for one or more client devices, such that one or more of a video transmission bit rate, frame rate, resolution or audio bit-depth is increased for the video stream. In some embodiments, prior to optimizing the modified video stream, the system determines that the one or more client devices are capable of receiving increased video quality.

In some embodiments, generating the modified video stream includes optimizing the video stream to provide an optimized video stream based on the video playing capabilities of one or more client devices.

At step 370, the system transmits the modified video stream to the one or more client devices. The client devices then receive the modified video stream in the same way they received the non-modified video stream earlier. In some cases, the modified video stream is received and played back at a higher quality corresponding to various video quality parameters in comparison to the earlier, non-modified video stream.

In some embodiments, the system sends a query to the one or more client devices regarding whether one or more of the video display quality parameters have improved. In some embodiments, the system then receives verification from the one or more client devices that the video display quality parameters have improved, and does not need to perform further optimization. In some embodiments, the system receives notice that the video display quality parameters have not improved. In various embodiments, the system may thereafter perform one or more backup optimization methods, perform one or more diagnostic assessments (e.g., network or bandwidth assessments), or notify one or more of the client devices that the attempted optimization of the video stream was unsuccessful.

In some embodiments, the system generates a second modified video stream by applying the video stream adjustment to the video stream. The system then transmits the modified video stream to a first set of client devices, and transmits the second modified video stream to a second set of client devices, wherein the modified video stream and the second modified video stream have at least one different video transmission bit rate, frame rate, resolution or audio bit-depth. This may be performed, for example, when two different receiving client devices have different needs for modified video streams to achieved optimized quality of the stream.

At step 380, the system receives updated video display quality parameters from the one or more client devices. In some embodiments, the system receives a retransmission of the data on video display quality received previously with the initial video display quality parameters, but updated such that the data is related to the modified video stream rather than the initial video stream. In some embodiments, the same quality parameters are sent as previously, in an updated fashion. In some embodiments, these updated parameters are sent periodically upon the modified video stream being transmitted, such as, e.g., every few minutes until the transmission terminates. In some embodiments, the system receives the updated parameters upon the system sending a query to the one or more client devices to send updated parameter data.

At step 390, the system compares the initial video display quality parameters and the updated video display quality parameters to determine that one or more video quality metrics has increased. In some embodiments, based on the updated video display quality parameters that were received in step 380, the system performs a comparison to obtain a differential, if any exists, between the two sets of data (i.e., the initial quality parameters and the updated quality parameters) to see if the quality has improved.

In some embodiments, the video quality metrics may include one or more pre-specified formulas, algorithms, or numbers pertaining to one or more of the initial and/or updated video display quality parameters. Such pre-specified metrics may allow the system to conclude or predict that the modified video stream has improved the video quality received at the one or more client devices. In some embodiments, the system may instead determine that the quality has not been improved. In such a scenario, the system may attempt to regenerate and retransmit the modified video stream, or simply retransmit the already generated modified video stream. In some embodiments, one or more alternate video stream adjustments may be made. In some embodiments, the system may once again receive updated video display quality parameters after such a retransmission of the modified video stream or a regenerated modified video stream is performed, and may then do another comparison and determination of which the metrics have improved. In some embodiments, the system may determine that a threshold of readjustment attempts or alternative adjustment attempts has been made, and may accordingly stop attempting video stream adjustments. In some embodiments, a notification may be sent to the transmitting device, the one or more client devices, or any combination thereof to inform that such attempts were unsuccessful.

In some embodiments, transmitting the video stream to the one or more client devices, receiving the initial video display quality parameters, determining the video stream adjustment, generating the modified video stream, transmitting the modified video stream to the one or more client devices, receiving the updated video display quality parameters, and comparing the updated video display quality parameters to the initial video display quality parameters are performed by the transmitting device. In some embodiments, a peer-to-peer network is configured between the transmitting device and one or more receiving devices, such that, e.g., a video stream, video display quality parameters, and other data may be transmitted directly between the transmitting device and one or more devices which received the transmitted stream from that transmitting device. In such embodiments, no video stream server is needed to receive the parameters, determine the video stream adjustment, generate the modified video stream, or other steps. Instead, the transmitting device is capable of performing such steps. In some embodiments, rather than the transmitting device performing all of the above-mentioned steps, the receiving device performs at least one of them.

Figure 4:
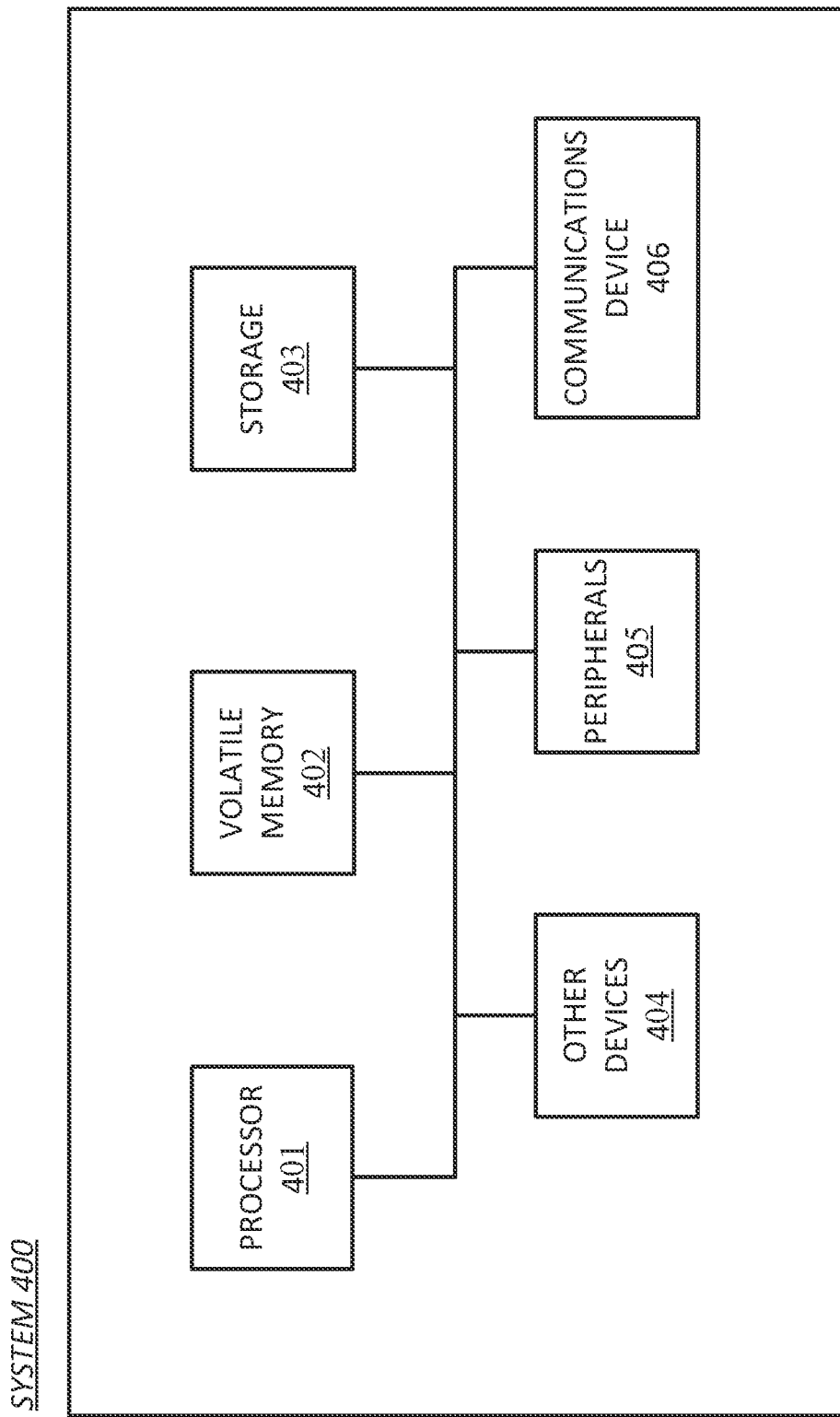
FIG. 4 is a diagram illustrating an exemplary computer that may perform processing in some embodiments.

FIG. 4 is a diagram illustrating an exemplary computer that may perform processing in some embodiments. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and including disks and flash memory, is an example of storage. Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as one or more displays. Peripherals 405 may include removable media devices such as CD-R and DVD-R recorders/players.

Communications device 406 may connect the computer 100 to an external medium. For example, communications device 406 may take the form of a network adapter that provides communications to a network. A computer 400 may also include a variety of other devices 404. The various components of the computer 400 may be connected by a connection medium such as a bus, crossbar, or network.

It will be appreciated that the present disclosure may include any one and up to all of the following examples.

Example 1. A method, comprising: receiving, at a server, an outgoing video stream from a transmitting device to a receiving device; identifying a first set of video parameter data corresponding to the quality of the outgoing video stream; receiving, from the receiving device, a second set of video parameter data corresponding to the quality of the video stream; determining one or more quality discrepancies between the first set of video parameter data and the second set of video parameter data; and providing notification of at least a subset of the quality discrepancies to one or both of the transmitting device and the receiving device.

Example 2. The method of example 1, wherein identifying the first set of video parameter data comprises: training a machine learning (ML) model to determine a set of video parameters related to video stream optimization; inputting the outgoing video stream into the trained ML model; and identifying, via the trained ML model, video parameter data from the outgoing video stream correlating to each of the determined video parameters.

Example 3. The method of any of examples 1-2, wherein determining the one or more quality discrepancies between the first set of video parameter data and the second set of video parameter data is performed using one or more ML techniques.

Example 4. The method of any of examples 1-3, wherein the received second set of video parameter data comprises the same video parameter types as the first set of video parameter data.

Example 5. The method of any of examples 1-4, wherein the determined one or more quality discrepancies comprise a discrepancy in one or more of: video resolution, and video frame rate.

Example 6. The method of any of examples 1-5, wherein the transmitting device and receiving device are configured to transmit data between one another directly via a peer-to-peer network.

Example 7. The method of any of examples 1-6, wherein the determined one or more quality discrepancies comprise a discrepancy in replacement rate of pixels shared between the outgoing video stream and the incoming video stream.

Example 8. The method of any of examples 1-7, wherein the outgoing video stream further comprises an audio signal, and wherein the determined one or more quality discrepancies comprise a discrepancy in audio quality.

Example 9. The method of example 8, wherein the discrepancy in audio quality comprises a discrepancy in audio bit rate.

Example 10. The method of any of examples 1-9, further comprising: determining, based on the one or more quality discrepancies, one or more optimization actions to be performed on the incoming video stream; generating a processed video stream by performing the one or more optimization actions on the incoming video stream; and sending the processed video stream to the receiving device as a substitute for the incoming video stream.

Example 11. The method of example 10, wherein the one or more optimization actions comprise reducing the color space of at least a portion of the incoming video stream.

Example 12. The method of example 10, wherein the one or more optimization actions comprise: segmenting, based on the one or more quality discrepancies, the incoming video stream into a plurality of regions, and applying one or both of: a quality reduction to one or more video parameters within a subset of the regions, and a quality increase to one or more video parameters in a subset of the regions.

Example 13. The method of example 12, wherein a quality reduction to one or more video parameters is applied, the quality reduction comprising a selective refresh of frames from the incoming video stream within a subset of the regions.

Example 14. The method of example 12, wherein shared content is presented within a region of the incoming video stream, and wherein the segmenting of the incoming video stream is performed based on the region where the shared content is presented.

Example 15. The method of example 10, wherein the outgoing video stream further comprises an audio signal, and wherein the one or more optimization actions comprise converting the audio signal of the incoming video stream from a stereophonic audio signal to a monophonic audio signal.

Example 16. The method of example 10, wherein the outgoing video stream further comprises an audio signal, and wherein the one or more optimization actions comprise applying one or more filters to the audio signal of the incoming video stream to reduce a range of audio frequencies.

Example 17. The method of any of examples 1-16, further comprising: receiving, at the server, a plurality of additional outgoing video streams from a plurality of additional transmitting devices to be transmitted to the receiving device as a plurality of incoming video streams; identifying additional sets of video parameter data corresponding to the quality of the additional outgoing video streams; determining one or more additional quality discrepancies between the additional sets of video parameter data and the second set of video parameter data; and providing notification of at least a subset of the additional quality discrepancies to one or more of: the corresponding transmitting device, and the receiving device.

Example 18. The method of example 17, wherein a plurality of different shared content is being presented within a plurality of the additional outgoing video streams, and further comprising: determining that a subset of the different shared content is not being displayed at the receiving device; and performing one or more quality reductions to one or more video parameters for the subset of the different shared content that is not being displayed at the receiving device.

Example 19. A communication system comprising one or more processors configured to perform the operations of: receiving, at a server, an outgoing video stream from a transmitting device to a receiving device; identifying a first set of video parameter data corresponding to the quality of the outgoing video stream; receiving, from the receiving device, a second set of video parameter data corresponding to the quality of the video stream; determining one or more quality discrepancies between the first set of video parameter data and the second set of video parameter data; and providing notification of at least a subset of the quality discrepancies to one or both of the transmitting device and the receiving device.

Example 20. The communication system of example 19, wherein identifying the first set of video parameter data comprises: training a machine learning (ML) model to determine a set of video parameters related to video stream optimization; inputting the outgoing video stream into the trained ML model; and identifying, via the trained ML model, video parameter data from the outgoing video stream correlating to each of the determined video parameters.

Example 21. The communication system of example 20, wherein determining the one or more quality discrepancies between the first set of video parameter data and the second set of video parameter data is performed using one or more ML techniques.

Example 22. The communication system of any of examples 19-21, wherein the received second set of video parameter data comprises the same video parameter types as the first set of video parameter data.

Example 23. The communication system of any of examples 19-22, wherein the determined one or more quality discrepancies comprise a discrepancy in one or more of: video resolution, and video frame rate.

Example 24. The communication system of any of examples 19-23, wherein the transmitting device and receiving device are configured to transmit data between one another directly via a peer-to-peer network.

Example 25. The communication system of any of examples 19-24, wherein the determined one or more quality discrepancies comprise a discrepancy in replacement rate of pixels shared between the outgoing video stream and the incoming video stream.

Example 26. The communication system of any of examples 19-25, wherein the outgoing video stream further comprises an audio signal, and wherein the determined one or more quality discrepancies comprise a discrepancy in audio quality.

Example 27. The communication system of example 26, wherein the discrepancy in audio quality comprises a discrepancy in audio bit rate.

Example 28. The communication system of any of examples 19-27, further comprising: determining, based on the one or more quality discrepancies, one or more optimization actions to be performed on the incoming video stream; generating a processed video stream by performing the one or more optimization actions on the incoming video stream; and sending the processed video stream to the receiving device as a substitute for the incoming video stream.

Example 29. The communication system of example 28, wherein the one or more optimization actions comprise reducing the color space of at least a portion of the incoming video stream.

Example 30. The communication system of example 28, wherein the one or more optimization actions comprise: segmenting, based on the one or more quality discrepancies, the incoming video stream into a plurality of regions, and applying one or both of: a quality reduction to one or more video parameters within a subset of the regions, and a quality increase to one or more video parameters in a subset of the regions.

Example 31. The communication system of example 30, wherein a quality reduction to one or more video parameters is applied, the quality reduction comprising a selective refresh of frames from the incoming video stream within a subset of the regions.

Example 32. The communication system of example 30, wherein shared content is presented within a region of the incoming video stream, and wherein the segmenting of the incoming video stream is performed based on the region where the shared content is presented.

Example 33. The communication system of example 28, wherein the outgoing video stream further comprises an audio signal, and wherein the one or more optimization actions comprise converting the audio signal of the incoming video stream from a stereophonic audio signal to a monophonic audio signal.

Example 34. The communication system of example 28, wherein the outgoing video stream further comprises an audio signal, and wherein the one or more optimization actions comprise applying one or more filters to the audio signal of the incoming video stream to reduce a range of audio frequencies.

Example 35. The communication system of any of examples 19-34, further comprising: receiving, at the server, a plurality of additional outgoing video streams from a plurality of additional transmitting devices to be transmitted to the receiving device as a plurality of incoming video streams; identifying additional sets of video parameter data corresponding to the quality of the additional outgoing video streams; determining one or more additional quality discrepancies between the additional sets of video parameter data and the second set of video parameter data; and providing notification of at least a subset of the additional quality discrepancies to one or more of: the corresponding transmitting device, and the receiving device.

Example 36. The communication system of example 17, wherein a plurality of different shared content is being presented within a plurality of the additional outgoing video streams, and further comprising: determining that a subset of the different shared content is not being displayed at the receiving device; and performing one or more quality reductions to one or more video parameters for the subset of the different shared content that is not being displayed at the receiving device.

Example 37. A non-transitory computer-readable medium containing instructions, comprising: instructions for receiving, at a server, an outgoing video stream from a transmitting device to a receiving device; instructions for identifying a first set of video parameter data corresponding to the quality of the outgoing video stream; instructions for receiving, from the receiving device, a second set of video parameter data corresponding to the quality of the video stream; instructions for determining one or more quality discrepancies between the first set of video parameter data and the second set of video parameter data; and instructions for providing notification of at least a subset of the quality discrepancies to one or both of the transmitting device and the receiving device.

Example 38. The non-transitory computer-readable medium of example 37, wherein identifying the first set of video parameter data comprises: training a machine learning (ML) model to determine a set of video parameters related to video stream optimization; inputting the outgoing video stream into the trained ML model; and identifying, via the trained ML model, video parameter data from the outgoing video stream correlating to each of the determined video parameters.

Example 39. The non-transitory computer-readable medium of example 38, wherein determining the one or more quality discrepancies between the first set of video parameter data and the second set of video parameter data is performed using one or more ML techniques.

Example 40. The non-transitory computer-readable medium of any of examples 37-39, wherein the received second set of video parameter data comprises the same video parameter types as the first set of video parameter data.

Example 41. The non-transitory computer-readable medium of any of examples 37-40, wherein the determined one or more quality discrepancies comprise a discrepancy in one or more of: video resolution, and video frame rate.

Example 42. The non-transitory computer-readable medium of any of examples 37-41, wherein the transmitting device and receiving device are configured to transmit data between one another directly via a peer-to-peer network.

Example 43. The non-transitory computer-readable medium of any of examples 37-42, wherein the determined one or more quality discrepancies comprise a discrepancy in replacement rate of pixels shared between the outgoing video stream and the incoming video stream.

Example 44. The non-transitory computer-readable medium of any of examples 37-43, wherein the outgoing video stream further comprises an audio signal, and wherein the determined one or more quality discrepancies comprise a discrepancy in audio quality.

Example 45. The non-transitory computer-readable medium of example 44, wherein the discrepancy in audio quality comprises a discrepancy in audio bit rate.

Example 46. The non-transitory computer-readable medium of any of examples 37-45, further comprising: determining, based on the one or more quality discrepancies, one or more optimization actions to be performed on the incoming video stream; generating a processed video stream by performing the one or more optimization actions on the incoming video stream; and sending the processed video stream to the receiving device as a substitute for the incoming video stream.

Example 47. The non-transitory computer-readable medium of example 46, wherein the one or more optimization actions comprise reducing the color space of at least a portion of the incoming video stream.

Example 48. The non-transitory computer-readable medium of example 46, wherein the one or more optimization actions comprise: segmenting, based on the one or more quality discrepancies, the incoming video stream into a plurality of regions, and applying one or both of: a quality reduction to one or more video parameters within a subset of the regions, and a quality increase to one or more video parameters in a subset of the regions.

Example 49. The non-transitory computer-readable medium of example 48, wherein a quality reduction to one or more video parameters is applied, the quality reduction comprising a selective refresh of frames from the incoming video stream within a subset of the regions.

Example 50. The non-transitory computer-readable medium of example 48, wherein shared content is presented within a region of the incoming video stream, and wherein the segmenting of the incoming video stream is performed based on the region where the shared content is presented.

Example 51. The non-transitory computer-readable medium of example 46, wherein the outgoing video stream further comprises an audio signal, and wherein the one or more optimization actions comprise converting the audio signal of the incoming video stream from a stereophonic audio signal to a monophonic audio signal.

Example 52. The non-transitory computer-readable medium of example 46, wherein the outgoing video stream further comprises an audio signal, and wherein the one or more optimization actions comprise applying one or more filters to the audio signal of the incoming video stream to reduce a range of audio frequencies.

Example 53. The non-transitory computer-readable medium of any of examples 37-52, further comprising: receiving, at the server, a plurality of additional outgoing video streams from a plurality of additional transmitting devices to be transmitted to the receiving device as a plurality of incoming video streams; identifying additional sets of video parameter data corresponding to the quality of the additional outgoing video streams; determining one or more additional quality discrepancies between the additional sets of video parameter data and the second set of video parameter data; and providing notification of at least a subset of the additional quality discrepancies to one or more of: the corresponding transmitting device, and the receiving device.

Example 54. The non-transitory computer-readable medium of example 53, wherein a plurality of different shared content is being presented within a plurality of the additional outgoing video streams, and further comprising: determining that a subset of the different shared content is not being displayed at the receiving device; and performing one or more quality reductions to one or more video parameters for the subset of the different shared content that is not being displayed at the receiving device.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
receiving, at a server, an outgoing video stream from a transmitting device to a receiving device;
identifying a first set of video parameter data corresponding to a quality of the outgoing video stream, wherein identifying the first set of video parameter data comprises:
training a machine learning (ML) model to determine a set of video parameters related to video stream optimization;
inputting the outgoing video stream into the trained ML model; and
identifying, via the trained ML model, video parameter data from the outgoing video stream correlating to each of the determined video parameters;
receiving, from the receiving device, a second set of video parameter data corresponding to the quality of the video stream;
determining one or more quality discrepancies between the first set of video parameter data and the second set of video parameter data; and
providing notification of at least a subset of the quality discrepancies to one or both of the transmitting device and the receiving device.

2. The method of claim 1, wherein determining the one or more quality discrepancies between the first set of video parameter data and the second set of video parameter data is performed using one or more ML techniques.

3. The method of claim 1, wherein the received second set of video parameter data comprises a same video parameter types as the first set of video parameter data.

4. The method of claim 1, wherein the determined one or more quality discrepancies comprise a discrepancy in one or more of: video resolution, and video frame rate.

5. The method of claim 1, wherein the transmitting device and receiving device are configured to transmit data between one another directly via a peer-to-peer network.

6. The method of claim 1, wherein the determined one or more quality discrepancies comprise a discrepancy in replacement rate of pixels shared between the outgoing video stream and an incoming video stream.

7. The method of claim 1, wherein the outgoing video stream further comprises an audio signal, and wherein the determined one or more quality discrepancies comprise a discrepancy in audio quality.

8. The method of claim 7, wherein the discrepancy in audio quality comprises a discrepancy in audio bit rate.

9. The method of claim 1, further comprising:
determining, based on the one or more quality discrepancies, one or more optimization actions to be performed on an incoming video stream;
generating a processed video stream by performing the one or more optimization actions on the incoming video stream; and
sending the processed video stream to the receiving device as a substitute for the incoming video stream.

10. The method of claim 9, wherein the one or more optimization actions comprise reducing a color space of at least a portion of the incoming video stream.

11. The method of claim 9, wherein the one or more optimization actions comprise:
segmenting, based on the one or more quality discrepancies, the incoming video stream into a plurality of regions, and
applying one or both of: a quality reduction to one or more video parameters within a subset of the regions, and a quality increase to one or more video parameters in a subset of the regions.

12. The method of claim 11, wherein a quality reduction to one or more video parameters is applied, the quality reduction comprising a selective refresh of frames from the incoming video stream within a subset of the regions.

13. The method of claim 11, wherein shared content is presented within a region of the incoming video stream, and wherein the segmenting of the incoming video stream is performed based on the region where the shared content is presented.

14. The method of claim 9, wherein the outgoing video stream further comprises an audio signal, and wherein the one or more optimization actions comprise converting the audio signal of the incoming video stream from a stereophonic audio signal to a monophonic audio signal.

15. The method of claim 9, wherein the outgoing video stream further comprises an audio signal, and wherein the one or more optimization actions comprise applying one or more filters to the audio signal of the incoming video stream to reduce a range of audio frequencies.

16. A communication system, comprising:
one or more processors configured to:
receive, at a server, an outgoing video stream from a transmitting device to a receiving device;
identify a first set of video parameter data corresponding to a quality of the outgoing video stream, wherein the one or more processors are configured to:
train a machine learning (ML) model to determine a set of video parameters related to video stream optimization;
input the outgoing video stream into the trained ML model; and
identify, via the trained ML model, video parameter data from the outgoing video stream correlating to each of the determined video parameters;
receive, from the receiving device, a second set of video parameter data corresponding to the quality of the video stream;
determine one or more quality discrepancies between the first set of video parameter data and the second set of video parameter data; and
provide notification of at least a subset of the quality discrepancies to one or both of the transmitting device and the receiving device.

17. The communication system of claim 16, wherein the one or more processors are further configured to:
receive, at the server, a plurality of additional outgoing video streams from a plurality of additional transmitting devices to be transmitted to the receiving device as a plurality of incoming video streams;
identify additional sets of video parameter data corresponding to the quality of the additional outgoing video streams;
determine one or more additional quality discrepancies between the additional sets of video parameter data and the second set of video parameter data; and
provide notification of at least a subset of the additional quality discrepancies to one or more of: the corresponding transmitting device, and the receiving device.

18. The communication system of claim 17, wherein a plurality of different shared content is being presented within a plurality of the additional outgoing video streams, and the one or more processors are further configured to:
determine that a subset of the different shared content is not being displayed at the receiving device; and
perform one or more quality reductions to one or more video parameters for the subset of the different shared content that is not being displayed at the receiving device.

19. A non-transitory computer-readable medium containing instructions, that when executed by one or more processors, causes the one or more processors to perform operations, comprising:
receiving, at a server, an outgoing video stream from a transmitting device to a receiving device;
identifying a first set of video parameter data corresponding to a quality of the outgoing video stream, wherein identifying the first set of video parameter data comprises:
training a machine learning (ML) model to determine a set of video parameters related to video stream optimization;
inputting the outgoing video stream into the trained ML model; and
identifying, via the trained ML model, video parameter data from the outgoing video stream correlating to each of the determined video parameters;
receiving, from the receiving device, a second set of video parameter data corresponding to the quality of the video stream;
determining one or more quality discrepancies between the first set of video parameter data and the second set of video parameter data; and
providing notification of at least a subset of the quality discrepancies to one or both of the transmitting device and the receiving device.

20. The non-transitory computer-readable medium of claim 19, wherein determining the one or more quality discrepancies between the first set of video parameter data and the second set of video parameter data is performed using one or more ML techniques.

* * * * *